(12) United States Patent
Lee

(10) Patent No.: US 12,240,158 B2
(45) Date of Patent: Mar. 4, 2025

(54) MULTI-JOINT ROBOT CAPABLE OF MOTION CONTROL

(71) Applicant: NAU Robotics Co., Ltd., Incheon (KR)

(72) Inventor: Jong Ju Lee, Incheon (KR)

(73) Assignee: NAU Robotics Co., Ltd., Incheon (KR)

( * ) Notice: Subject to any disclaimer, the term of this patent is extended or adjusted under 35 U.S.C. 154(b) by 4 days.

(21) Appl. No.: 18/196,696

(22) Filed: May 12, 2023

(65) Prior Publication Data

US 2024/0375332 A1      Nov. 14, 2024

(51) Int. Cl.
*B29C 45/00* (2006.01)
*B25J 19/02* (2006.01)
(Continued)

(52) U.S. Cl.
CPC .............. *B29C 45/42* (2013.01); *B25J 19/023* (2013.01); *B25J 19/065* (2013.01); *B25J 17/025* (2013.01); *B25J 19/022* (2013.01)

(58) Field of Classification Search
CPC .............. B29C 45/04; B29C 45/14008; B29C 45/14065; B29C 45/1756; B29C 45/42;
(Continued)

(56) References Cited

U.S. PATENT DOCUMENTS 5,629,031 A * 5/1997 Ishikawa ................. B29C 45/42
425/165
7,118,365 B2 * 10/2006 Shirahata ............ B29C 45/7626
425/444
(Continued)

FOREIGN PATENT DOCUMENTS

KR    10-0632957 B1    10/2006

*Primary Examiner* — Thu Khanh T. Nguyen
(74) *Attorney, Agent, or Firm* — Bridgeway IP Law Group, PLLC; Hyun Woo Shin

(57) ABSTRACT

Provided is a multi-joint robot which is capable of performing motion control and includes a part for easily setting a moving path, an angle, and the like of a take-out device in a process of taking out an injection-molded object. To this end, the present disclosure includes a molding part configured to mold an object, a multi-joint robot configured to move close to the molding part and take out the object, a first controller connected to the above work components and configured to control driving of the work components, a marker connected to the first controller and provided on each of joints of the multi-joint robot, and a camera part configured to photograph movement of the marker, and transmit movement information of the multi-joint robot according to the movement of the marker to the first controller, and an overrun detector is provided on at least one of the joints of the multi-joint robot to detect an overrun operation exceeding an operation range of a joint movement and transmit a warning signal about the overrun operation to the first controller. According to the present disclosure, even a low-skilled worker can easily set access and work of a worker at an injection molding site without performing coding, thus reducing a difficulty level of work and maximizing process efficiency, control whether to perform injection according to whether a door is open or not, thereby securing safety, and control quality and a take-out environment using environmental information received by the molding part.

4 Claims, 11 Drawing Sheets

(51) Int. Cl.
    *B25J 19/06*           (2006.01)
    *B29C 45/42*           (2006.01)
    *B25J 17/02*           (2006.01)

(58) Field of Classification Search
    CPC ....... B29C 45/76; B29C 45/768; B29C 45/80; B29C 45/842; B29C 2945/7633; B29C 2945/76117; B29C 2945/76795
    See application file for complete search history.

(56)             References Cited

U.S. PATENT DOCUMENTS

| | | | |
|---|---|---|---|
| 9,199,375 B2 * | 12/2015 | Miyoshi | B25J 15/0616 |
| 10,981,316 B2 * | 4/2021 | Hoeglinger | B29C 45/42 |
| 2012/0296471 A1 * | 11/2012 | Inaba | B25J 9/1694 |
| | | | 700/253 |
| 2018/0056558 A1 * | 3/2018 | Fukumoto | B29C 45/06 |
| 2021/0008769 A1 * | 1/2021 | Tsuchiya | B29C 45/14008 |

\* cited by examiner

MULTI-JOINT ROBOT CAPABLE OF MOTION CONTROL

FIELD OF THE INVENTION

The present disclosure relates to a multi-joint robot capable of performing motion control, and more particularly to, a multi-joint robot including a part for easily setting a moving path and an angle of a take-out device in a process of taking out an injection-molded object.

DISCUSSION OF RELATED ART

Globally, manufacturing robots are major equipment that performs in-process tasks from the production of products to the shipment of the products and exhibit higher process efficiency through an automatic adjustment program or the like than humans, and are therefore used in a wide range of technologies.

In particular, manufacturing robots are generally used in a process of injection molding objects by heating materials such as metals and plastics, injecting the materials into a mold, and cooling and curing the materials. Specifically, a safety accident may occur and efficiency is very low when a worker manually grips a molded object, which is relatively high in temperature and weight, or lifts and moves the molded object with a tool, and thus manufacturing robots are employed and used at industrial sites. Here, take-out robots that are used to take out injection-molded objects should hold and transport objects along a predetermined path while minimizing damage to the objects, and thus a majority of robots distributed in the take-out robot market are Cartesian robots. However, as injection machines are increasing in weight and size, quickly taking out objects is inevitably related to process efficiency, and multi-joint robots are emerging to facilitate access and implementation for secondary automation linkage to post-processing after taking out an object and a subsequent process.

Related document 1 (Korean Patent Registration No. 10-0632957) discloses a multi-joint robot for injection molding as described above which is capable of automatically performing insertion of an insert and taking out an object, so that the permeation of foreign substances may be prevented and the automation of the process may be facilitated to maximize process efficiency. However, in order to operate the robot disclosed in related document 1, a moving path should be set by coding, but setting the moving path by coding is a high-level task, and thus it is continuously required for an engineer related to setting robots to visit when molds are frequently replaced, and a non-operating time increases.

RELATED ART LITERATURE

Patent Document

Related document 1: Korean Patent Registration No. 10-0632957 (registration date: Jun. 29, 2006)

SUMMARY OF THE INVENTION

Technical Problem

To address the above problems, the present disclosure is directed to providing a robot that is easily introduced at an injection-molding site and of which a movement path can be conveniently set and modified, so that the visit of an engineer related to setting robots may be omitted and a non-operation time may be reduced to save time and costs.

The present disclosure is also directed to providing a dedicated multi-joint robot for an injection-molding machine including a dedicated controller and a user interface (UI) part, thereby enabling even a low-skilled worker to easily set and modify a moving path of the robot.

The present disclosure is also directed to receiving injection environment information to be used for quality control of an injection-molded product and controlling an injection environment, when necessary, to inject a better-quality injection-molded product.

Technical Solution

According to an aspect of the present disclosure, a multi-joint robot includes a controller (300) configured to control driving of each joint of the multi-joint robot, a marker (330) provided on each joint of the multi-joint robot, a camera part (340) connected to the controller (300) and configured to photograph movement of the marker (330) and transmit movement information of the multi-joint robot according to the movement of the marker (330) to the controller (300), and an overrun detector provided on at least one of the joints of the multi-joint robot, and configured to detect an overrun operation exceeding an operation range of joint movement and transmit a warning signal about the overrun operation to the controller (300).

Advantageous Effects

According to the present disclosure, even a low-skilled worker can easily set and perform work with work components at an injection molding site to reduce a difficulty level of work and maximize process efficiency.

According to the present disclosure, the position of a work component corresponding to a work location of each of operations of a process of taking out an object can be modified and stored using a UI part provided during the setting of the work with the work components, so that a molding part may interwork with the work components without performing coding that is complicated to perform, thereby saving time and costs.

In addition, according to the present disclosure, a molding part is capable of obtaining environmental information, such as a temperature and a pressure which are measured by a sensor, to obtain information necessary for quality control, thereby contributing to quality control of an object, and an environment in which the object is taken out of the molding part can be controlled to improve the quality of the object when necessary.

DETAILED DESCRIPTION OF EXEMPLARY EMBODIMENTS

The terms used herein will be briefly described, and embodiments of the present disclosure will be described in detail. In the present specification, general terms that have been widely used nowadays are selected, when possible, in consideration of functions of the present disclosure, but non-general terms may be selected according to the intentions of technicians in this art, precedents, or new technologies, etc. Some terms may be arbitrarily chosen by the present applicant. In this case, the meanings of these terms will be explained in corresponding parts of the present disclosure in detail. Accordingly, the terms used herein should be defined not based on the names thereof but based on the meanings thereof and the whole context of the present disclosure.

Hereinafter, embodiments of the present disclosure will be described in detail with reference to the accompanying drawings.

Before the present disclosure is described in detail, the term "object" should be understood herein as a product, i.e., an article to be post-processed or packed, which is manufactured by a molding part 100, such as a molding device, and the molding part 100 may be expanded to not only a molding device but also any of various types of manufacturing devices.

Figure 1:
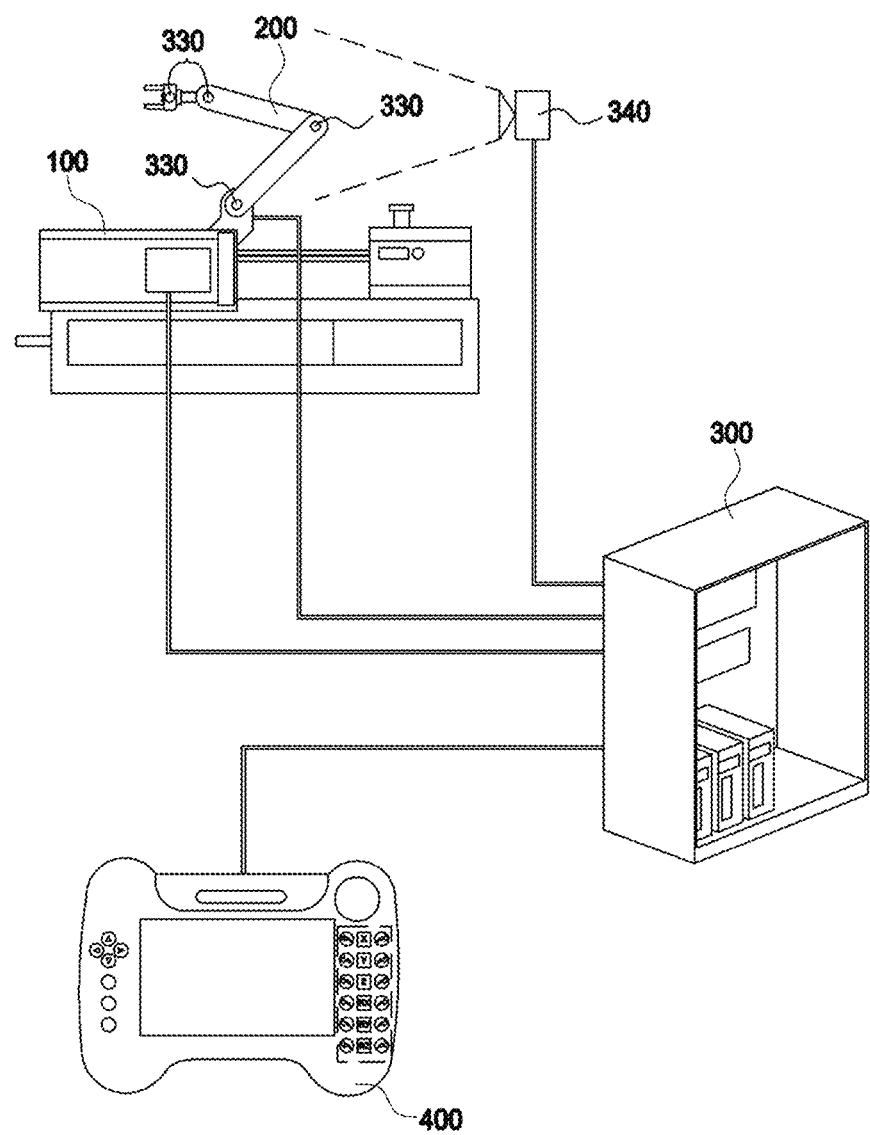
FIG. 1 is a view of a multi-joint robot and a controller according to an embodiment of the present disclosure.

FIG. 1 is a view of a multi-joint robot and a controller according to an embodiment of the present disclosure.

A multi-joint robot 200 according to the embodiment of the present disclosure may be a robot for taking out an object. Specifically, an object may be manufactured in a molding part 100 connected to the multi-joint robot 200. The multi-joint robot 200 moves a take-out head close to the molding part 100, operates the take-out head to withdraw the object, and moves the object to the outside of the molding part 100 through joint movement. The multi-joint robot 200 is connected to the controller 300 to control an operation of the multi-joint robot 200 by the controller 300.

Through the above configuration of the multi-joint robot 200, the multi-joint robot 200 may take out the object and thus a process of a worker taking out the object by lifting the object manually or using a tool may be omitted, thereby securing the safety of workers and uniform quality of the object.

A marker 330 is provided on each joint of the multi-joint robot 200, and is preferably further provided on the take-out head so that a change of angle of the take-out head of the multi-joint robot 200 can be checked. The marker 330 is provided in a specific color or provided to reflect light of a specific color so that a camera part 340, which will be described below, may identify the location of the marker 330.

The camera part 340 is configured to photograph movement of the marker 330. The camera part 340 may photograph movement of the marker 330 to capture an image of a motion, and transmit the image to the controller 300 connected to the camera part 340. The controller 300 may check and store movement information of the multi-joint robot 200 on the basis of the movement of the marker 330, and operate according to the stored movement information when necessary.

On the other hand, the marker 330 may be installed in a dummy robot, the size of which is equal to the actual size of the multi-joint robot 200 or is reduced at a certain ratio, rather than the multi-joint robot 200 that is actually operable, so that an image of a motion may be captured safely and efficiently to control an operation of the multi-joint robot 200, or the marker 330 may be attached to a part of the user's body such as a joint to induce the operation of the multi-joint robot 200.

When the marker 330 and the camera part 340 are configured as described above, movement information of the multi-joint robot 200 may be checked and stored repeatedly using a motion capture method.

Figure 2:
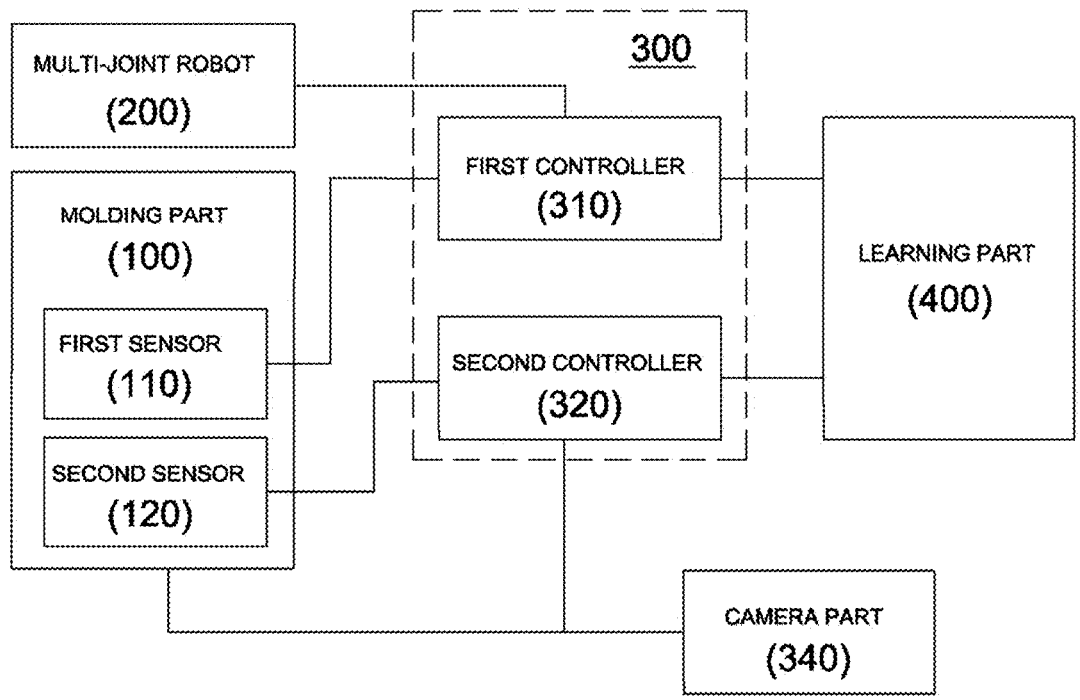
FIG. 2 is a diagram illustrating a relationship between a multi-joint robot, a molding part, and a controller according to an embodiment of the present disclosure.

FIG. 2 is a diagram illustrating a relationship between a multi-joint robot, a molding part, and a controller according to an embodiment of the present disclosure. Referring to FIG. 2, the controller 300 may include a first controller 310 and a second controller 30 for control of an operation of the multi-joint robot 200.

The first controller 310 may be connected to the multi-joint robot 200 to control driving of the multi-joint robot 200, and drive the multi-joint robot 200 on the basis of information input through the learning part 400 to be described below.

Figure 3:
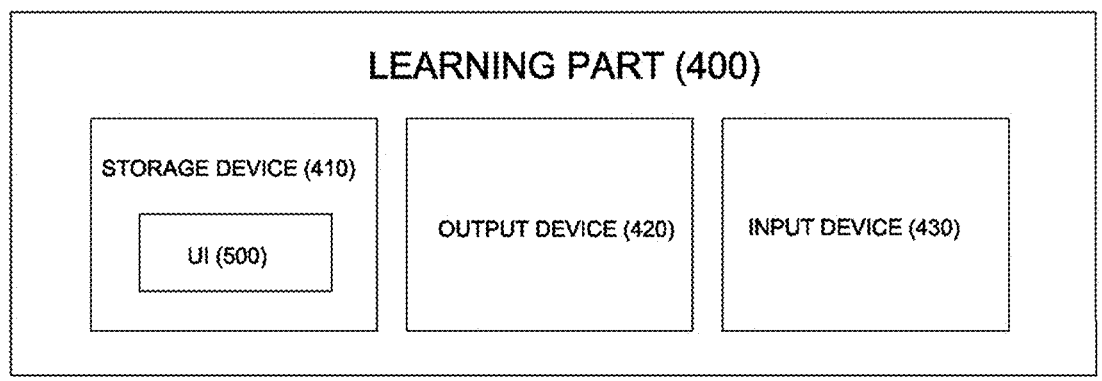
FIG. 3 is a schematic diagram illustrating a configuration of a learning part according to the present disclosure.

FIG. 3 is a schematic diagram illustrating a configuration of a learning part according to the present disclosure.

A learning part 400 is configured to set and store movement information and work location information of the multi-joint robot 200, and transmit the stored movement information and work location information to the first controller 310. Specifically, the learning part 400 may be connected to the first controller 310, set and store movement information and work location information of the multi-joint robot 200, and transmit the movement information and the work location information to the first controller 310. The first controller 310 may perform a process of moving the multi-joint robot 200 and taking out an object based on the movement information and the work location information that are received from the learning part 400. To this end, the learning part 400 may be provided in the form of a control module including a storage device 410, an output device 420, and an input device 430. Specifically, the storage device 410 is configured to store a user interface (UI) part 500 in advance, and store the movement information and the work location information of the multi-joint robot 200. In this case, the location of the work is a location at which the multi-joint robot 200 starts the work that is divided into several operations to be performed by the multi-joint robot 200, and the work location information is location information such as coordinates for memorizing the location of the work. The movement information is information for movement from a previous work location to a next work location, such as a moving path, a speed, etc., when a location of work is changed in units of the operations of the work.

The output device 420 is configured to output the UI part 500 stored in the storage device 410 to display a control screen 510. Specifically, the UI part 500 stored in the storage device 410 is output to the output device 420, and includes a UI part 500 that is in the form of a work location icon 511 related to the composition of the location of the work of the multi-joint robot 200, a UI part 500 that is in the form of a work location name icon 512 of the multi-joint robot 200, and a UI part 500 that is in the form of a setting icon 513 for manipulating the location of the multi-joint robot 200, and the like to form the control screen 510. As described above, the multi-joint robot 200 may be manipulated through the control screen 510 composed of the UI part 500 output to the output device 420 to set and store a moving path and the location of the work of the multi-joint robot 200. Meanwhile, the output device 420 may be provided in the form of a light-emitting diode (LED) lamp, a liquid crystal display (LCD) lamp, or the like or may be provided as a touch screen. Specifically, the output device 420 may be provided in the form of a panel, such as an LED or an LCD, to be attached to the outside of the molding part 100 or the multi-joint robot 200 or provided as a screen of a teaching pendant 421.

Figure 4:
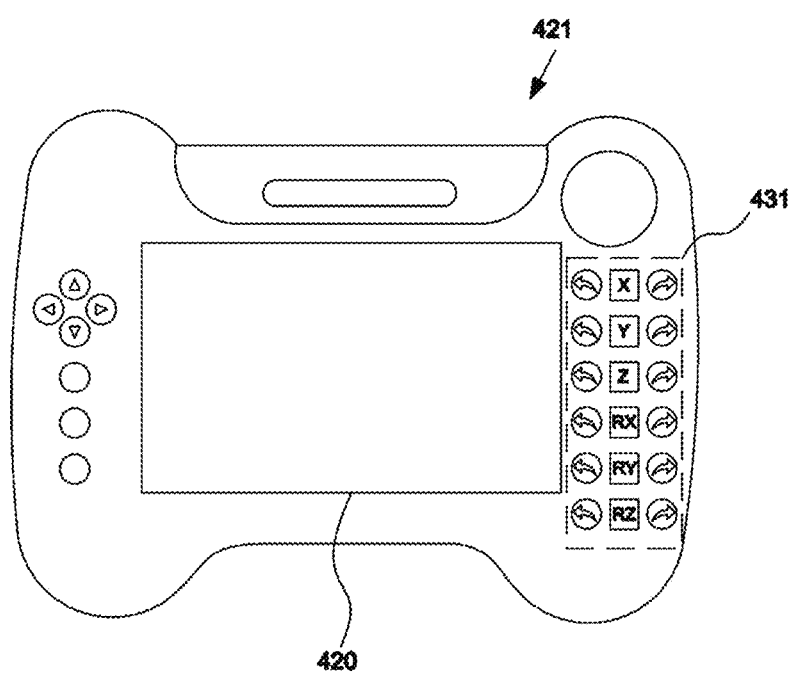
FIG. 4 is a diagram illustrating a control screen according to an embodiment of the present disclosure.

The input device 430 may be provided in the form of a physical button, and when the output device 420 is a touch screen, the touch screen may be an input/output device 420, and the input device 430 such as separate physical buttons may be provided together with the input/output device 420 which is a touch screen. Teaching pendants 421 are widely used for manipulation of industrial equipment or industrial robots, and are provided only in the form of a display with a key button and a screen for convenience of a user in an industrial site where a monitor and a mouse cannot be used and in automation equipment which does not require specific manipulation. In the present disclosure, an example in which the output device 420 and the input device 430 are provided as the teaching pendant 421 will be described. FIG. 4 is a diagram illustrating a shape and configuration of the teaching pendant 421 when an output device 420 and an input device 430 of a learning part 400 are provided as the teaching pendant 421. Referring to FIG. 4, the output device 420, e.g., a touch screen, and the input device 430, e.g., physical buttons, may be provided as the teaching pendant 421, and input may be performed using the physical buttons even when touching cannot be smoothly implemented, because the separate physical buttons are provided. According to the present disclosure, an example in which the output device 420 and the input device 430 are provided together as a touch screen, and the input device 430 that is in the form of separate physical buttons is also provided will be described but the output device 420 and the input device 430 may be provided in a manner different from that described above or in various other ways of performing input and output operations.

Location information of the multi-joint robot 200 necessary for interworking of the multi-joint robot 200 and an injection machine may be visualized to be easily identified through the learning part 400 described above, and the location of work of the multi-joint robot 200 corresponding to the work location icon 511 of the multi-joint robot 200 may be easily input and set.

Figure 5:
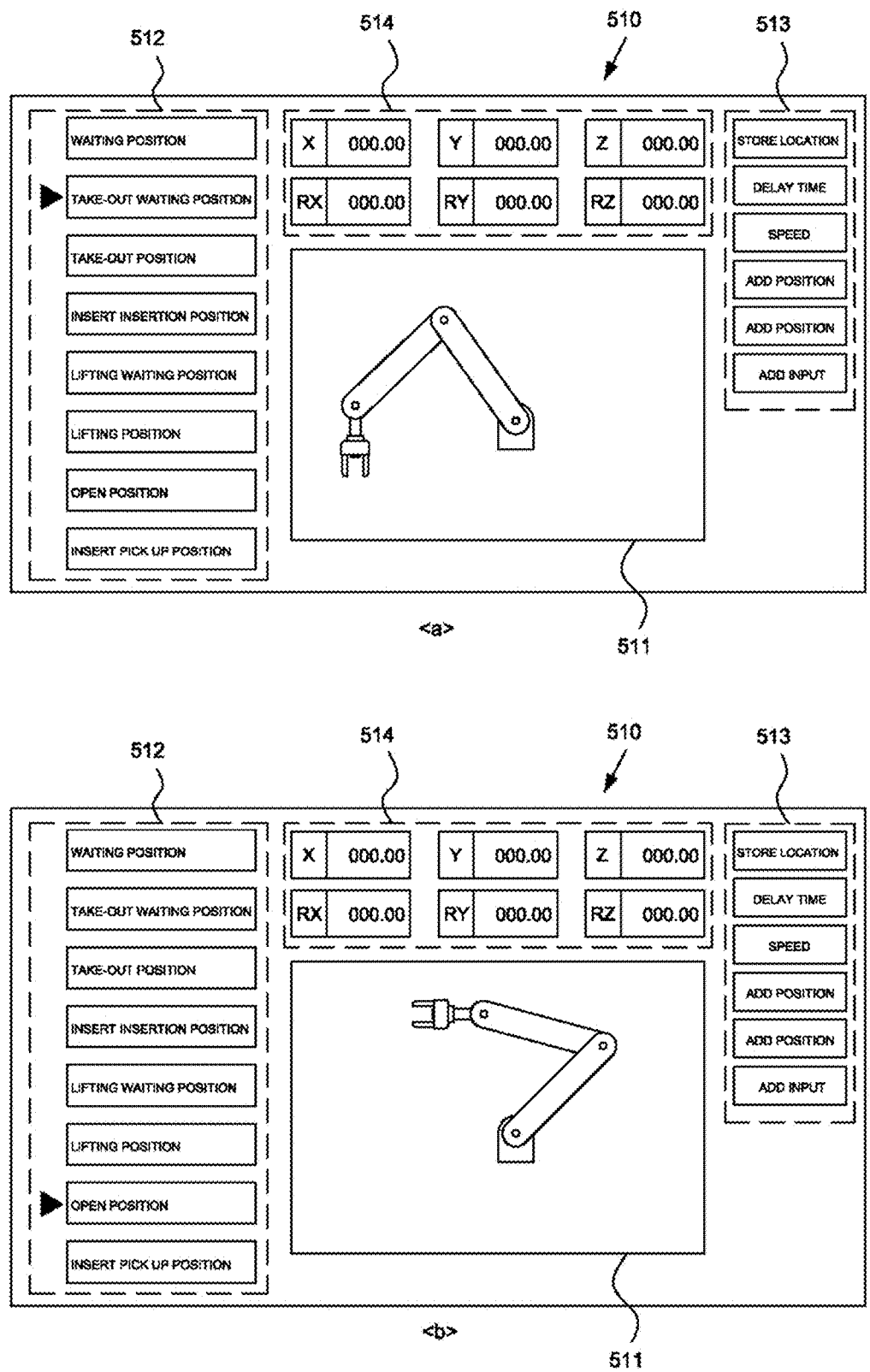
FIG. 5 is a diagram illustrating a shape and a configuration of a teaching pendant according to an embodiment of the present disclosure.

The UI part 500 is a user interface that is output to the output device 420 to easily set and store movement information and work location information, and is stored in the learning part 400. FIG. 5 is a diagram illustrating a control screen 510 on which the UI part 500 is arranged.

FIG. 5A represents a control screen 510 corresponding to a take-out standby position, and FIG. 5B represents a control screen 510 corresponding to an open position. Referring to FIG. 5, the UI part 500 is largely divided into a work location icon 511, a work location name icon 512, and a setting icon 513, and these icons are output to the output device 420 to form the control screen 510.

Work location information about work locations, such as a waiting position of the multi-joint robot 200, a take-out waiting position, a take-out position, an insert insertion position, a lifting waiting position, a lifting position, an open position, and an insert pick-up position, may be provided. However, the work locations are based on an assumption that post-processing is performed to insert an insert during taking out of an object, other necessary work locations may be added or unnecessary work locations may be deleted, and a work location UI part 500 regarding corresponding work may be stored when non-take-out work is performed.

The waiting position is a position set to determine whether the multi-joint robot 200 is at the right position before a take-out waiting stage of an object. The take-out waiting position is a position at which the molding part 100 approaches and stops, and the take out position is a work position at which the multi-joint robot 200 approaches the object to take the object out toward the outside of the molding part 100 (a direction opposite a direction toward the inside of the molding part 100).

The insert insertion position is a position at which an insert attached to a head formed on an end of the multi-joint robot 200 may be inserted to be in contact with the object to be connected and fastened to the object, and more particularly, a position that is the same as or adjacent to the take-out position to face the molding part 100.

The lifting waiting position is a position at which the end of the articulated robot 200 and the object may be lifted while the multi-joint robot 200 is coupled to the object, and the lifting position is a position at which the object is lifted to be separated from the molding part 100.

The open position is a position at which the object into which the insert is inserted is separated from the multi-joint robot 200, and the insert pick-up position is a position at which the object is separated and the insert is picked up to be inserted into a next object.

As described above, when the work location icon 511 for a take-out robot is output to the output device 420, a worker may intuitively identify each of the work locations, manipulate the multi-joint robot 200, and store work location information of a corresponding location in the storage device 410 of the learning part 400.

FIG. 5 is a diagram illustrating a shape and configuration of a teaching pendant 421 when an output device 420 and an input device 430 of a learning part 400 are provided as the teaching pendant 421. Referring to FIG. 5, a worker may store movement information and work location information and set work locations using buttons displayed on a control screen 510 output to the output device 420 included in the learning part 400 and physical buttons. The control screen 510 may be displayed on the output device 420 of the learning part 400 and configured to display the UI part 500 stored in the learning part 400, and may be further configured to display coordinate information 514 of the multi-joint robot 200. According to an embodiment of the present disclosure, the coordinate information 514 of the multi-joint robot 200 is preferably displayed to identify work location information to be stored, and thus an example in which the coordinate information 514 of the multi-joint robot 200 is also displayed on the control screen 510 will be described.

In this case, the work location icon 511 representing the coordinate information 514 may also be stored in the learning part 400 in advance.

Referring to FIG. 5, the UI part 500 includes work location icons 511, work location name icons 512, and setting icons 513. When a touch input is applied to the work location name icons 512, corresponding work location icons 512 are displayed on the output device 420 of the learning part 400. More specifically, when a touch input is applied to an open position name icon while a work location icon 512 representing the take-out waiting position is displayed as shown in of FIG. 5A, a work location icon 511 representing the open position may be displayed as shown in FIG. 5B to help the worker understand, so that work locations may be easily set and a currently set work location may be identified.

The setting icons 513 are configured to allow the worker to position the multi-joint robot 200 at a work location set by the worker and the work location to be stored in the storage device 410 of the learning part 400. The setting icons 513 may include a "store position" button to enable the worker to store the movement information and work location information, and may further include buttons such as a "speed" button and a "delay time" button for control of the movement information and an "add position" button for control of the work location information. Specifically, after the multi-joint robot 200 is positioned at a work location set by the worker, the "store position" button among the setting icons 513 displayed on the output device 420 of the learning part 400 may be clicked to store current movement information and current work location information, and other buttons among the setting icons 513 may be clicked to add the speed of the movement information, a delayed time, a new location or the like.

A process of setting work locations will be described in detail below. When the worker selects a work location to be set and applies a touch input onto a name icon button of the selected work location, a UI part 500 related to the position and configuration of the multi-joint robot 200 at the work location is displayed as the work location icon 511 on the output device 420 to help the worker understand and complete preparation for setting the work location. Next, the multi-joint robot 200 is moved to set a work location. In a method of moving the multi-joint robot 200, axis movement buttons 431 illustrated in FIG. 4 are clicked to adjust the positions of X, Y, Z, RX, RY, and RZ axes of the multi-joint robot 200 and move the multi-joint robot 200, and to set and store the work location by positioning the multi-joint robot 200 at a correct location while watching the movement of the multi-joint robot 200. Specifically, when an axial direction is displayed and the axis movement buttons 431 which are arrow buttons representing opposite sides in the axial direction are clicked, the multi-joint robot 200 may be moved clockwise or counterclockwise with respect to a corresponding axis to be located at the work location. After moving the multi-joint robot 200 at the corresponding work location, the "store position" button among the setting icons 513 may be clicked to store the work location.

That is, the worker clicks the work location name icon 512 to set a work location, clicks the axis movement button 431 to move the location of the multi-joint robot 200 while checking the movement of the multi-joint robot 200, and clicks the "store position" button to store the work location. In this case, it is possible to position a take-out robot at each work location and store each work location by a method different from the above-described method, it is possible to set and store a work location by a direct teaching method, i.e., a method of moving the take-out robot to a work location directly and physically by a worker and storing the work location, or it is possible to set and store a work location by directly inputting the coordinates of each axis.

On the other hand, a moving path along which a multi-joint robot moves from one work location to another work location may be set in a sequential setting manner of setting work locations of a take-out robot in an order in which work is performed or an individual setting manner of setting work locations of a take-out robot regardless of an order in which work is performed. In the sequential setting manner, in order to set a next work location at each work location, movement information, e.g., a path and a speed, for moving the multi-joint robot 200 may be stored in the learning part 400 and transmitted to the first controller 310 during the movement of the multi-joint robot 200, so that the multi-joint robot 200 may be moved on the basis of the stored movement information and an optimal traffic line for movement from each work location to a next work location may be found. In the individual setting manner, only each work location is stored, and thus a method of finding an optimal traffic line from a previous work location to a next work location may be used, and movement information for movement in a section from each work location to a next work location may be stored when necessary. According to an embodiment of the present disclosure, a method of storing movement information of a moving path based on the sequential setting manner of setting work locations in the order in which work is performed will be described. In this way, work locations may be manually controlled, and movement information and work location information can be stored through a series of processes, and thus a multi-joint robot can be easily manipulated without coding the multi-joint robot in a complicated manner.

Referring to FIG. 2, the molding part 100 may further include a first sensor 110, a second sensor 120, and a second controller 320.

The molding part 100 may be open in a lateral direction in which an object is injected, and a door part may be separately installed on an opening of the molding part 100. When the door part is installed, the object is taken out by the multi-joint robot 200 after the door part is open. In this case, the first sensor 110 may be connected to the door part to detect whether the door part is open or not, and the first controller 310 may be connected to the first sensor 110 of the molding part 100 to receive sensing information about the opening or closing of the door part detected by the first sensor 110 and control the multi-joint robot 200 on the basis of the sensing information. Specifically, when sensing information about the closing of the door part is received from the first sensor 110, the first controller 310 may control driving of the multi-joint robot 200 to stop taking out the object and stand by, and even when the first controller 310 receives sensing information about the opening of the door part from the first sensor 110 and proceeds with the taking out of the object, the first controller 310 may control the driving of the multi-joint robot 200 to stop taking out the object and stand by when the closing of the door part is detected.

When the first sensor 110 is provided as described above, whether the multi-joint robot 200 takes out an object may be controlled by detecting whether the door part is open or not, thereby preventing a risk of collision between the multi-joint robot 200 and the door part.

The molding part 100 may further include the second sensor 120 including several sensors for sensing environmental information, such as a temperature, pressure, and humidity, inside the molding part 100. The second sensor 120 may be communicatively connected to the second controller 320 to transmit and receive environmental information. The second controller 320 may be connected to the second sensor 120 to receive environmental information, such as a temperature, pressure, and humidity, inside the molding part 100 that is detected by the second sensor 120 and check whether an object is taken out of the molding part 100 in a constant environment on the basis of the received environmental information, and may be connected to the learning part 400 to transmit the environmental information to the learning part 400, so that the environmental information may be checked by a worker through the output device 420. In addition, when numerical values required for taking out a better-quality product, such as a temperature and a pressure, are input through the input device 430 of the learning part 400 on the basis of the environmental information received by the second controller 320, the numerical values may be transmitted to the second controller 320 connected to the molding part 100, and the second controller 320 may control the molding part 100 to control an object to be taken out while controlling numerical values, such as the temperature and the pressure, causing influences on quality when the object is taken out. Although it is described in the present disclosure that the second controller 320 is provided to control the second sensor 120 to receive environmental information and control the molding part 100, the first controller 310 may control the second sensor 120 to receive environmental information or control the molding part 100 or an additional controller may be provided to control the molding part 100.

When the second controller 320 is provided as described above, a worker is able to receive environmental information, combine sensing information and the environmental information, provide information necessary for quality control, perform monitoring for quality control, and control a take-out environment of the molding part 100 to improve quality.

Meanwhile, an overrun operation exceeding an operation range of joint movement of each joint of the multi-joint robot 200 may occur during operation. In this case, damage may be caused due to the breakdown of joints or the entire multi-joint robot 200. Therefore, there is a need for a device that generates a warning signal to allow a worker to recognize an overrun operation or to cut the supply of power to prevent damage when an overrun operation occurs.

To this end, a multi-joint robot according to the present disclosure may include an overrun detector.

Specifically, the overrun detector may be coupled to at least one of the joints of the multi-joint robot to transmit a warning signal to a controller when an overrun operation is detected. Upon receiving the warning signal, the controller may control the supply of power for joint movement to be cut, thereby preventing damage to the components of the multi-joint robot.

Preferably, the overrun detector may detect an overrun operation by measuring a degree of deformation of the joint axis 21 relative to a force applied to the joint axis 21.

Figure 6:
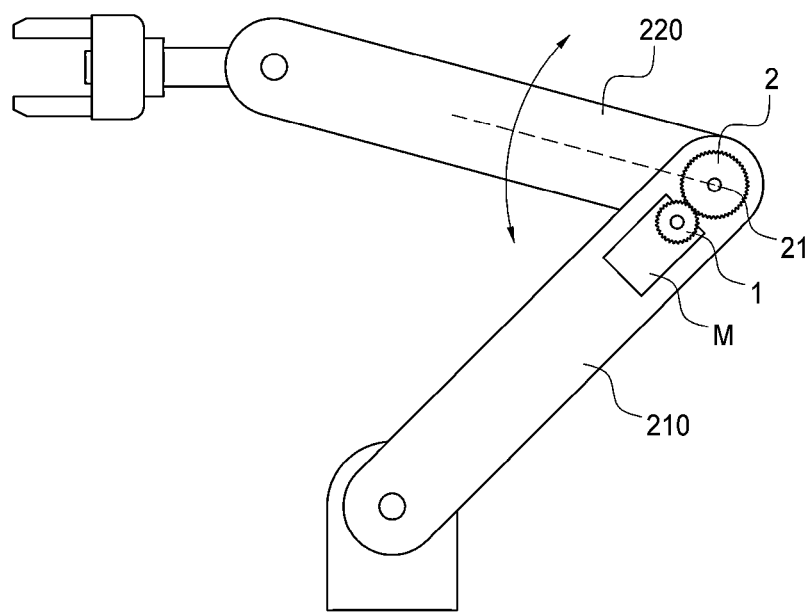
FIG. 6 is a diagram illustrating a configuration of a joint of a multi-joint robot according to an embodiment of the present disclosure.

FIG. 6 is a diagram illustrating a configuration of a joint of a multi-joint robot according to an embodiment of the present disclosure. Specifically, a joint between a first arm 210 and a second arm 220 of the multi-joint robot is illustrated. Joint movement of the second arm 220 is performed by a driving gear 2 (as indicated by an arrow of FIG. 6). The driving gear 2 is rotated while coupled to a power gear 1, and the power gear 1 is rotated while coupled to a power source M included in the first arm 210.

Here, the second arm 220 is connected to the driving gear 2 through a joint axis 21. That is, the driving gear 2 applies a turning force to the joint axis 21, and the joint axis 21 is fixed on the second arm 220 to transmit the turning force to the second arm 220, so that the joint movement of the second arm 220 may be performed.

Although FIG. 6 has been described above with respect to the joint between the first arm 210 and the second arm 220, it will be readily inferred by those of ordinary skill in the art that the above structure is applicable to the other joints of the multi-joint robot. Therefore, an object that is a joint movement target will be hereinafter referred to as a "body part."

Figure 7:
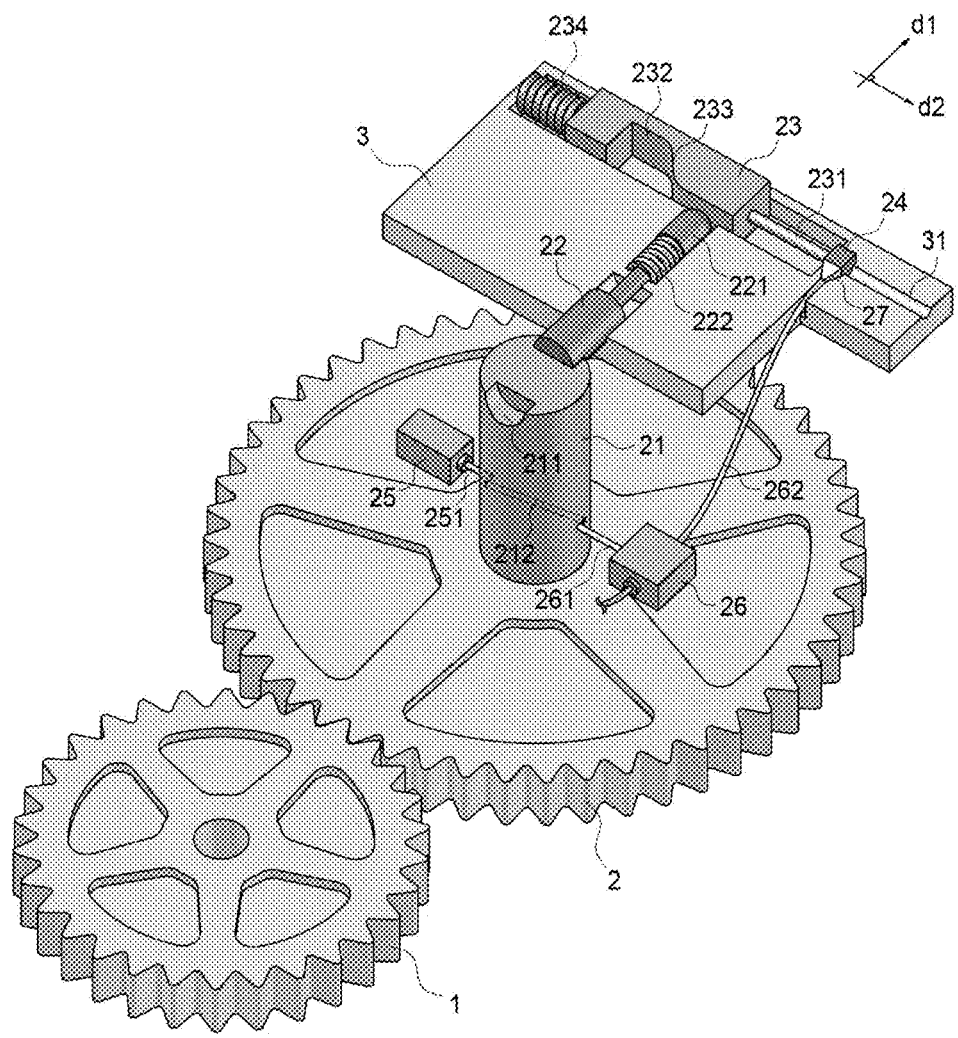
FIG. 7 is a view illustrating an overrun detector according to an embodiment of the present disclosure.

FIG. 7 is a view illustrating an overrun detector according to an embodiment of the present disclosure. FIG. 7 illustrates only some parts of a body part 3, and the body part 3 may correspond to the second arm 220 of FIG. 6.

Referring to FIG. 7, the overrun detector includes an optical path 212 extending from one point on an outer circumferential surface of a joint axis 21 to another point on the outer circumferential surface while passing through the joint axis 21, a light incidence part 25 that allows detection light to be incident toward the point from the outside of the joint axis 21, and a light receiver 26 positioned opposite to the light incidence part 25 with respect to the joint axis 21, and configured to receive the detection light coming from the other point while passing through the optical path 212.

Preferably, the light incidence part 25 may include a light emitter that generates the detection light, and a light incidence path 251.

The light emitter is supplied with electrical energy and generates detection light with a certain wavelength and a certain output. Preferably, the light emitter may be a laser generator that generates detection light that is in the form of laser.

The light incidence path 251 guides the detection light generated from the light emitter to be transmitted to the optical path 212. Preferably, the light incidence path 251 may be formed of an optical fiber that minimizes the loss of the energy of the detection light through total reflection.

The light receiver 26 may include an optical sensor and a light-receiving path 261. The light-receiving path 261 guides the detection light passing through the optical path 212 to be transmitted to the optical sensor. Preferably, the light-receiving path 261 may be formed of an optical fiber that minimizes the loss of the energy of the detection light through total reflection.

When the detection light reaches the light receiver 26 through the optical path 212 due to an overrun operation, the light receiver 26 transmits a warning signal to the controller.

As shown in FIG. 7, the optical path 212 is fixed while misaligned by a certain angle with respect to the light incidence part 25 and the light receiver 26. The misalignment prevents the detection light from being transmitted to the light receiver 26 in a normal state in which no overrun operation occurs.

Figure 8:
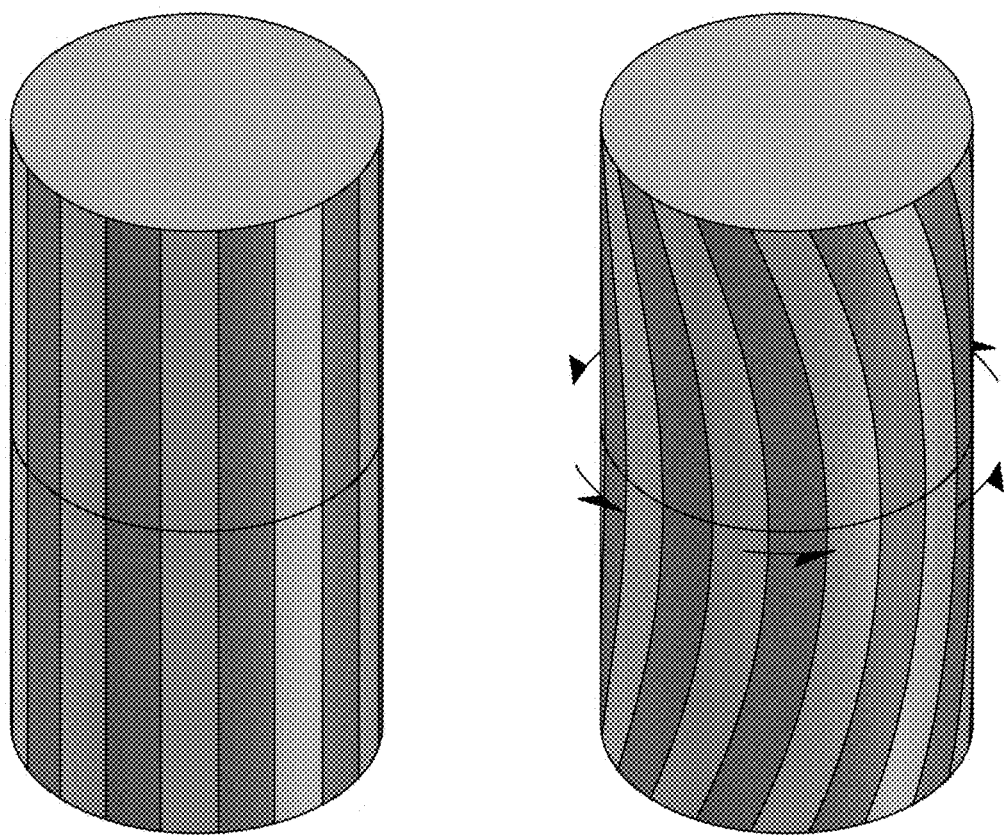
FIG. 8 shows deformation of the cylindrical object when a turning force is applied thereto.

The joint axis 21 is preferably formed of a rigid material but may be deformed to a small degree when a force is applied thereto. Referring to FIG. 8, when a turning force is applied to a middle portion of a cylindrical object, which is a left diagram (as shown in a right diagram), the middle portion is deformed to the largest degree in a rotational direction and a rate of deformation decreases farther away from the middle portion, resulting in twisted deformation.

Actually, the joint axis 21 is deformed to a very small degree. Although the drawings of the present application are exaggerated for clarity, the angle by which the optical path 212 is misaligned is preferably an angle of 1 degree or less.

At the same time, the light incidence path 251, the optical path 212, and the light-receiving path 261 preferably have a small diameter of 1 mm or less.

The light incidence path 251, the optical path 212, and the light-receiving path 261 of the present disclosure are configured to detect such deformation. As described above, the optical path 212 is fixed while misaligned by a certain angle and thus the joint axis 21 is deformed to a small degree in a normal state in which no excessive force is applied to the joint axis 21. On the other hand, when a higher turning force than that in the normal state is applied to the joint axis 21 due to an overrun operation, the joint axis 21 is deformed and causes the angle of the optical path 212 to match the light incidence part 25 and the light receiver 26. To this end, an initial angle (the angle) of the optical path 212 may be set to be smaller than an angle thereof when the optical path 212 is deformed to the largest degree immediately before the breakdown of the joint axis 21, in consideration of the material of the joint axis 21. That is, the initial angle of the optical path 212 is set to be greater than a change of angle thereof due to the deformation of the joint axis 21 in the normal state and to be less than a change of angle thereof due to the largest degree of deformation of the joint axis 21 before the joint axis 21 breaks down.

Upon receiving the warning signal, the controller may control the supply of power for joint movement to be cut, thereby preventing damage to the components of the multi-joint robot.

Preferably, the light incidence part 25 and the light receiver 26 are formed on points on the joint axis 21 on which a rate of deformation is largest. Referring to FIG. 7, when a turning force is applied to the joint axis 21 from the driving gear 2 coupled to one end of the joint axis 21, the joint axis 21 transmits the turning force to the body part 3 to which the joint axis 21 is coupled through a fixing part 22 coupled to another end of the joint axis 21.

Figure 9:
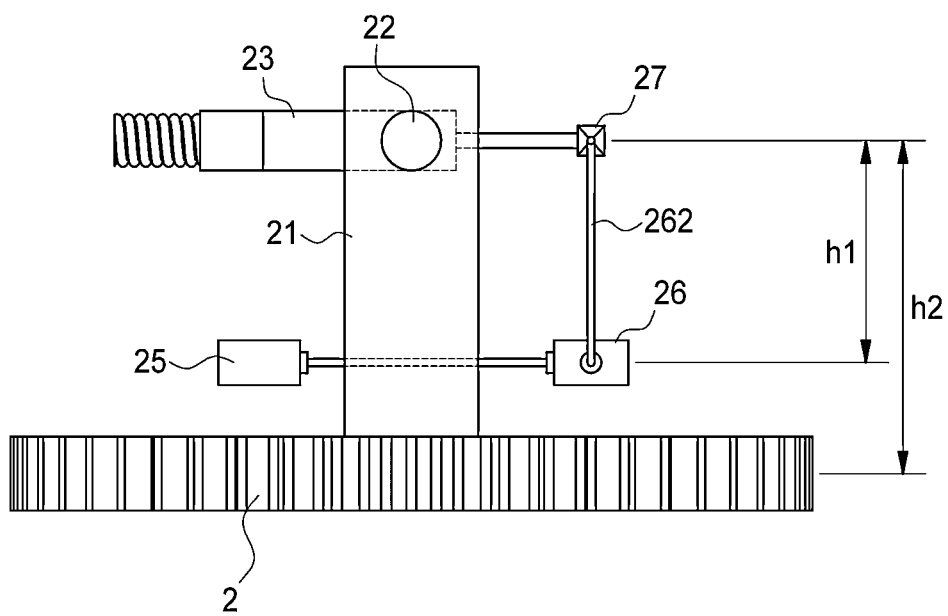
FIG. 9 is a side view of an overrun detector according to an embodiment of the present disclosure.

Here, the light incidence part 25 and the light receiver 26 are formed between the driving gear 2 and the fixing part 22. More preferably, referring to FIG. 9, the light incidence part 25 and the light receiver 26 are formed at positions closest to the driving gear 2. That is, the light incidence part 25 and the light receiver 26 are formed such that the difference h1 from the positions of the light incidence part 25 and the light receiver 26 to the position of the fixing part 22 is substantially the same as the difference h2 between the driving gear 2 and the fixing part 22.

In an example embodiment, the fixing part 22 may be configured to be automatically separated from the joint axis 21 when an overrun operation is detected. Accordingly, a risk of breakage of the multi-joint robot may be reduced by cutting the supply of power by the controller and ensuring double safety.

Specifically, referring to FIG. 7, the other end of the joint axis 21 is provided with a fixing groove 211 into which the fixing part 22 is inserted, and the joint axis 21 transmits a turning force to the fixing part 22 inserted into the fixing groove 211. Here, the fixing part 22 is separated from the fixing groove 211 when the detection light reaches the light receiver 26. Accordingly, even when the turning force is continuously applied from the driving gear 2, the joint axis 21 may rotate freely, thus preventing an excessive force from being applied to components such as the body part 3 and the joint axis 21.

More specifically, the fixing part 22 is provided in the form of a bar in a first direction d1 perpendicular to the outer circumferential surface of the joint axis 21, and is moved to cause one end thereof to be inserted into or separated from the fixing groove 211.

Another end of the fixing part 22 is provided with a protrusion 221, and a first spring 222 is coupled to the protrusion 221 to press the protrusion 221 toward the other end of the fixing part 22.

The other end of the fixing part 22 is provided with a blocking bar 23 to block the movement of the fixing part 22, and the blocking bar 23 is moved to cancel the blocking of the movement when the detection light reaches the light receiver 26.

More specifically, the blocking bar 23 is disposed in a bar shape in a second direction d2 perpendicular to a moving direction of the fixing part 22, and a groove part 232 is formed in one side surface of the blocking bar 23.

The blocking bar 23 is moved to cause a position of the groove part 232 to correspond to a position of the other end of the fixing part 22 when the detection light reaches the light receiver 26. More preferably, the groove part 232 may be provided with an inclined plane 233. When the blocking bar 23 is restored to an original position thereof through the inclined plane 233, the protrusion 221 may be naturally pressed by the blocking bar 23, thus causing the fixing part 22 to be restored to an original position thereof.

Preferably, a second spring 234 may be coupled to one end of the blocking bar 23 to press the blocking bar 23 toward another end of the blocking bar 23, and the other end of the blocking bar 23 may be provided with a blocking body 24 for blocking the movement of the blocking bar 23. Specifically, the other end of the blocking bar 23 is provided with a pin type support pin 231, and the body part 3 is provided with a pin hole 31 with a diameter through which the support pin 231 may pass. The blocking body 24 is fixed while positioned between the support pin 231 and the pin hole 31 to prevent the support pin 231 from passing through the pin hole 31. Accordingly, when the blocking body 24 is separated, the blocking bar 23 and the fixing part 22 may be automatically moved.

In this way, the movement of the fixing part 22 is limited by double blocking to disperse a force applied to the fixing part 22. Specifically, because a force is applied to the fixing part 22 through the joint axis 21 for joint movement of the body part 3, the first spring 222 should have elasticity sufficient to separate the fixing part 22 from the fixing groove 211. Therefore, an object should have rigidity sufficient to block the movement of the fixing part 22. Therefore, the blocking bar 23 is formed of a rigid material to block the movement of the fixing part 22.

Because a direction in which a force is applied by the first spring 222 is the first direction d1, the blocking bar 23 may be moved by a relatively small force in the second direction perpendicular to the first direction d1. That is, the second spring 234 may be a spring with elasticity lower than that of the first spring 222. Accordingly, the blocking body 24 may be formed of a material with rigidity lower than those of the fixing part 22 and the blocking bar 23.

Preferably, the blocking body 24 may be a material that is in a solid state at room temperature (a temperature range of 0° C. to 50° C.) and that changes into a liquid phase when heat energy is applied thereto. According to an embodiment, the blocking body 24 may be formed of a beeswax material. A heater 27 may be provided on a side surface of the blocking body 24 to apply heat energy to the blocking body 24 when detection light reaches the light receiver 26.

Figure 10:
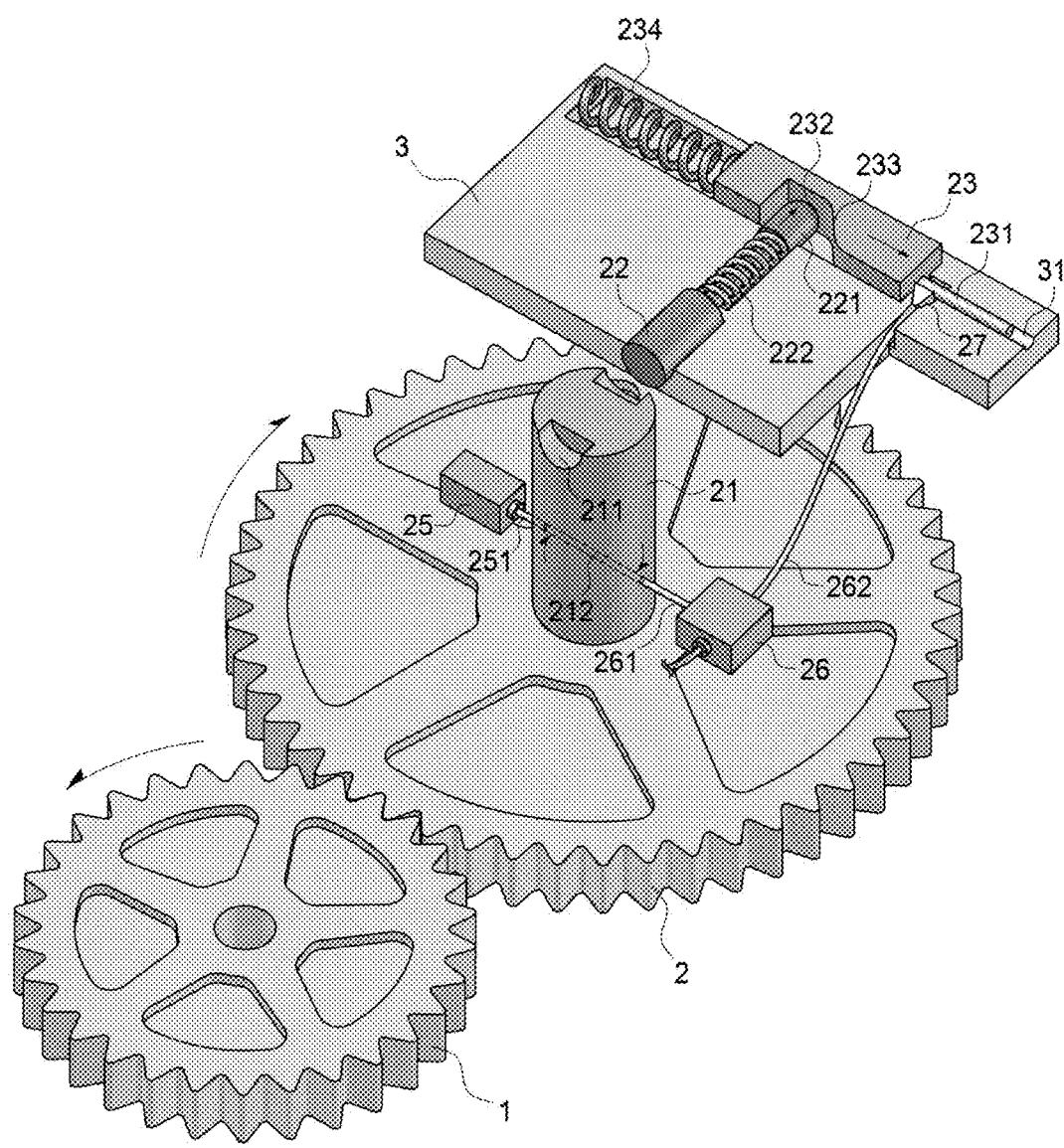
FIG. 10 is a diagram illustrating an operational state of an overrun detector according to an embodiment of the present disclosure from the same point of view as FIG. 7.
Figure 11:
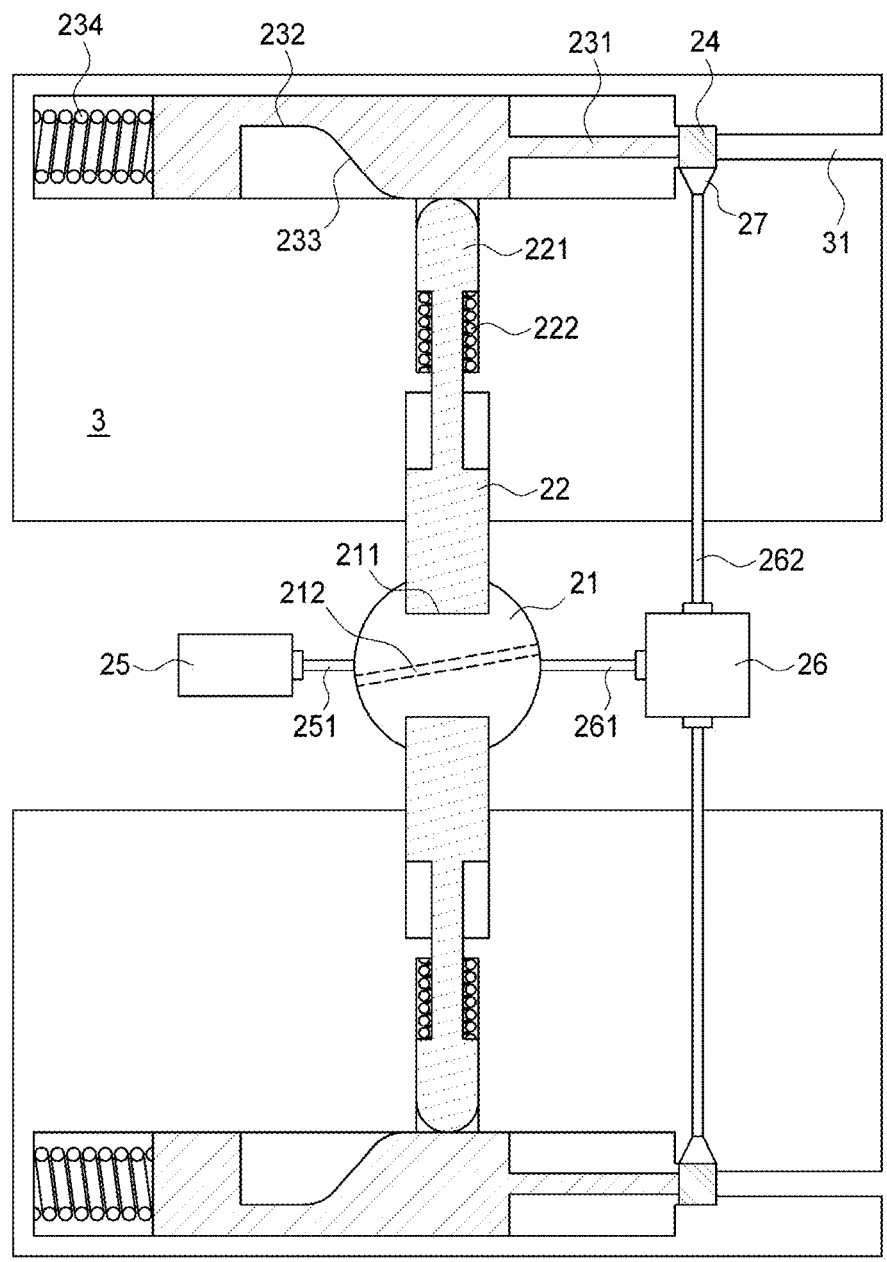
FIG. 11 is a plan view of FIG. 7 from above.
Figure 12:
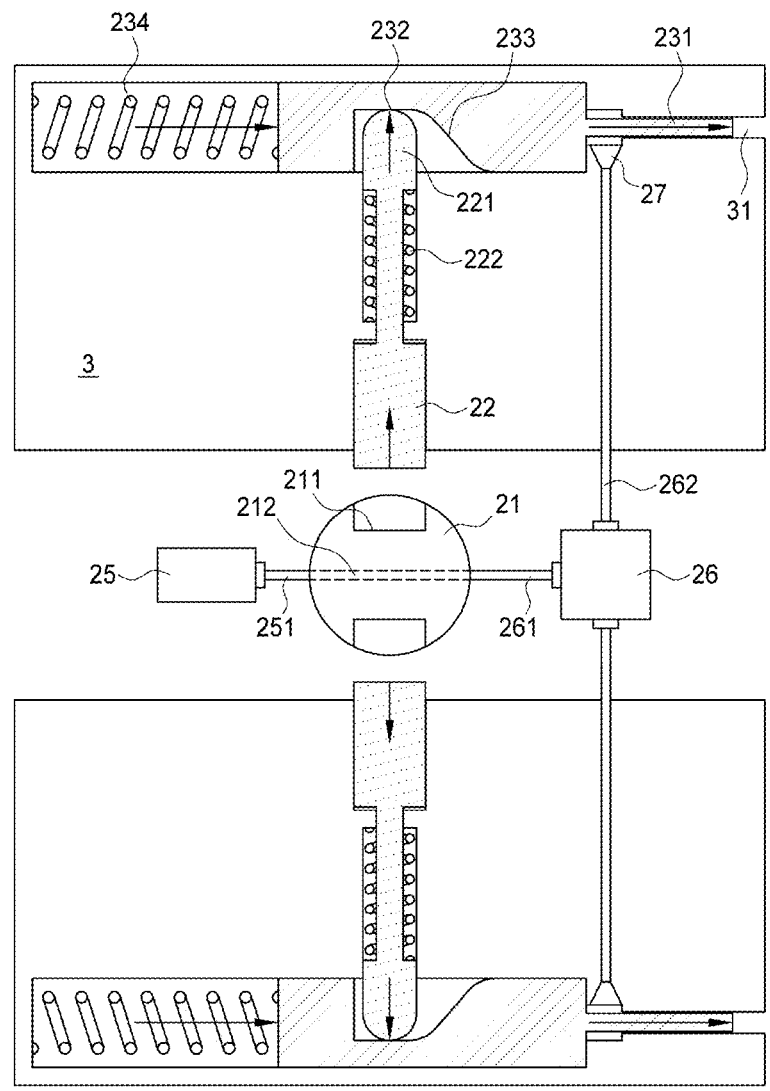
FIG. 12 is a plan view of FIG. 10 from above.

FIG. 10 is a diagram illustrating an operational state of an overrun detector according to an embodiment of the present disclosure from the same point of view as FIG. 7. FIG. 11 is a plan view of FIG. 7 from above. FIG. 12 is a plan view of FIG. 10 from above.

An operation of the overrun detector according to an embodiment of the present disclosure will be described with reference to FIGS. 7, 10, 11, and 12 below.

A turning force is applied to the joint axis 21 due to the rotation of the driving gear 2, and in the normal state, the fixing part 22 transmits the turning force applied to the joint axis 21 to the body part 3 while inserted into the fixing groove 211. Accordingly, the body part 3 makes the joint movement.

In contrast, when the turning force is continuously applied by the driving gear 2 even in an overrun state, i.e., although the body part 3 cannot make the joint movement, the joint axis 21 is deformed and changes the angle of the optical path 212 to match the light incidence part 25 and the light receiver 26. Accordingly, the detection light reaches the light receiver 26, and the light receiver 26 operates the heater 27 to change the blocking body 24 into a liquid state.

The blocking body 24 in the solid state blocks the movement of the support pin 231, but the blocking body 24 in the liquid state is pushed by a force applied by the second spring 234 and separated through the pin hole 31, thus allowing the support pin 231 to pass through the pin hole 31. Accordingly, the blocking bar 23 is moved in the second direction d2, and the protrusion 221 is inserted into the groove part 232. As the protrusion 221 is inserted into the groove part 232, the fixing part 22 is separated from the fixing groove 211, and the joint axis 21 is decoupled from the body part 3 and thus is freely rotatable.

With the above-described configuration, the supply of power is automatically canceled in the overrun state, thereby preventing damage to precision machine parts.

In addition, it is possible to restore to an original state by simply replacing the blocking body 24 with another, and the blocking body 24 may be formed of a material that is inexpensive and easily processable and thus is easy to repair and maintain.

The above-described embodiments of the present disclosure are provided merely for the purpose of illustration, and it will be apparent to those of ordinary skill in the art that various modifications, changes, and additions may be made without departing from the spirit and scope of the present disclosure and are within the scope of the following claims.

Various substitutions, modifications and changes may be made by those of ordinary skill in the art to which the present disclosure pertains without departing from the technical spirit of the present disclosure and thus the present disclosure should not be understood as being limited by the embodiments described above and the accompanying drawings.

[Description of Reference Numerals]

| | | | |
|---|---|---|---|
| 100: | molding part | 110: | first sensor |
| 120: | second sensor | 200: | multi-joint robot |
| 300: | controller | 310: | first controller |
| 320: | second controller | 330: | marker (330) |
| 340: | camera part (340) | | |
| 400: | learning part | 410: | storage device |
| 420: | output device | 421: | teaching pendant |
| 430: | input device | 431: | axis movement button |
| 500: | UI part | 510: | control screen |
| 511: | work location icon | 512: | work location name icon |
| 513: | setting icon | 514: | coordinate information |

The invention claimed is:

1. A multi-joint robot for taking out a molded object, comprising:
a controller configured to control driving of joints of the multi-joint robot;
a marker provided on each of the joints of the multi-joint robot;
a camera part connected to the controller and configured to photograph movement of the marker and transmit movement information of the multi-joint robot according to the movement of the marker to the controller; and
an overrun detector provided on at least one of the joints of the multi-joint robot and configured to detect an overrun operation exceeding an operation range of joint movement and transmit a warning signal about the overrun operation to the controller,
wherein the controller controls a supply of power for the joint movement to be cut when the warning signal is received,
the overrun detector detects an overrun operation by measuring a degree of deformation of a joint axis relative to a force applied to the joint axis,
the overrun detector comprises:
an optical path formed from one point on an outer circumferential surface of the joint axis to another point on the outer circumferential surface while passing through the joint axis;
a light incidence part configured to allow detection light to be incident toward the one point from an outside of the joint axis; and
a light receiver positioned opposite to the light incidence part with respect to the joint axis and configured to receive the detection light coming from an other point while passing through the optical path,
the joint axis is fixed to cause the optical path to be misaligned by a certain angle with respect to the light incidence part and the light receiver,
when a turning force is applied to the joint axis through a driving gear coupled to one end of the joint axis, the joint axis transmits the turning force to a body part to which the joint axis is coupled through a fixing part coupled to an other end of the joint axis,
the other end of the joint axis is provided with a fixing groove into which the fixing part is inserted,
the fixing part is inserted into the fixing groove, and the turning force is applied to the fixing part from the joint axis,
the fixing part is separated from the fixing groove when the detection light reaches the light receiver,
the light incidence part and the light receiver are formed between the driving gear and the fixing part,
the light receiver transmits the warning signal to the controller when an angle of the optical path matches the light incidence part and the light receiver due to deformation of the joint axis and thus the detection light reaches the light receiver,
the fixing part is provided in a form of a bar in a first direction perpendicular to an outer circumferential surface of the joint axis,
the fixing part is moved to cause one end thereof to be inserted into or separated from the fixing groove,
an other end of the fixing part is provided with a protrusion,
a first spring for pressing the protrusion toward the other end of the fixing part is coupled to the protrusion,
the other end of the fixing part is provided with a blocking bar for blocking movement of the fixing part, and the blocking bar is moved to cancel the blocking of the movement of the fixing part when the detection light reaches the light receiver.

2. The multi-joint robot of claim 1, wherein the blocking bar is disposed in a bar shape in a second direction perpendicular to a moving direction of the fixing part, a groove part is formed in a side surface of the blocking bar, and the blocking bar is moved to cause a position of the groove part to correspond to a position of the other end of the fixing part when the detection light reaches the light receiver.

3. The multi-joint robot of claim 2, wherein one end of the blocking bar is coupled with a second spring for pressing the blocking bar toward an other end of the blocking bar, and the other end of the blocking bar is provided with a blocking body for blocking movement of the blocking bar, and the blocking body is separated when the detection light reaches the light receiver.

4. The multi-joint robot of claim 3, further comprising a heater configured to apply heat energy to the blocking body when the detection light reaches the light receiver, wherein the blocking body is formed of a material that is changed into a liquid state by heat energy supplied from the heater.

* * * * *